Figure 1:
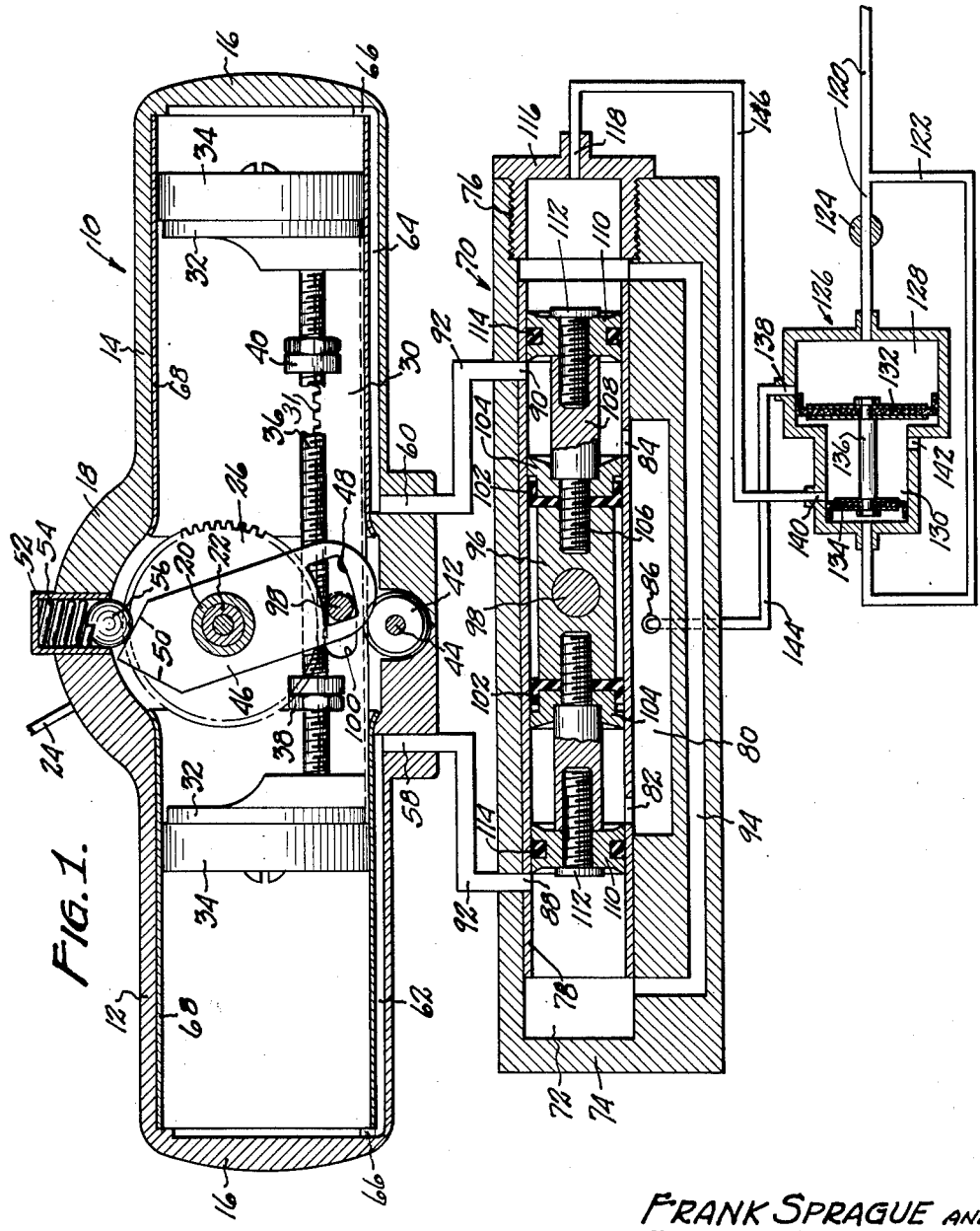

FRANK SPRAGUE AND
ELTON F. NICHOLS.
INVENTORS.

ATTORNEYS.

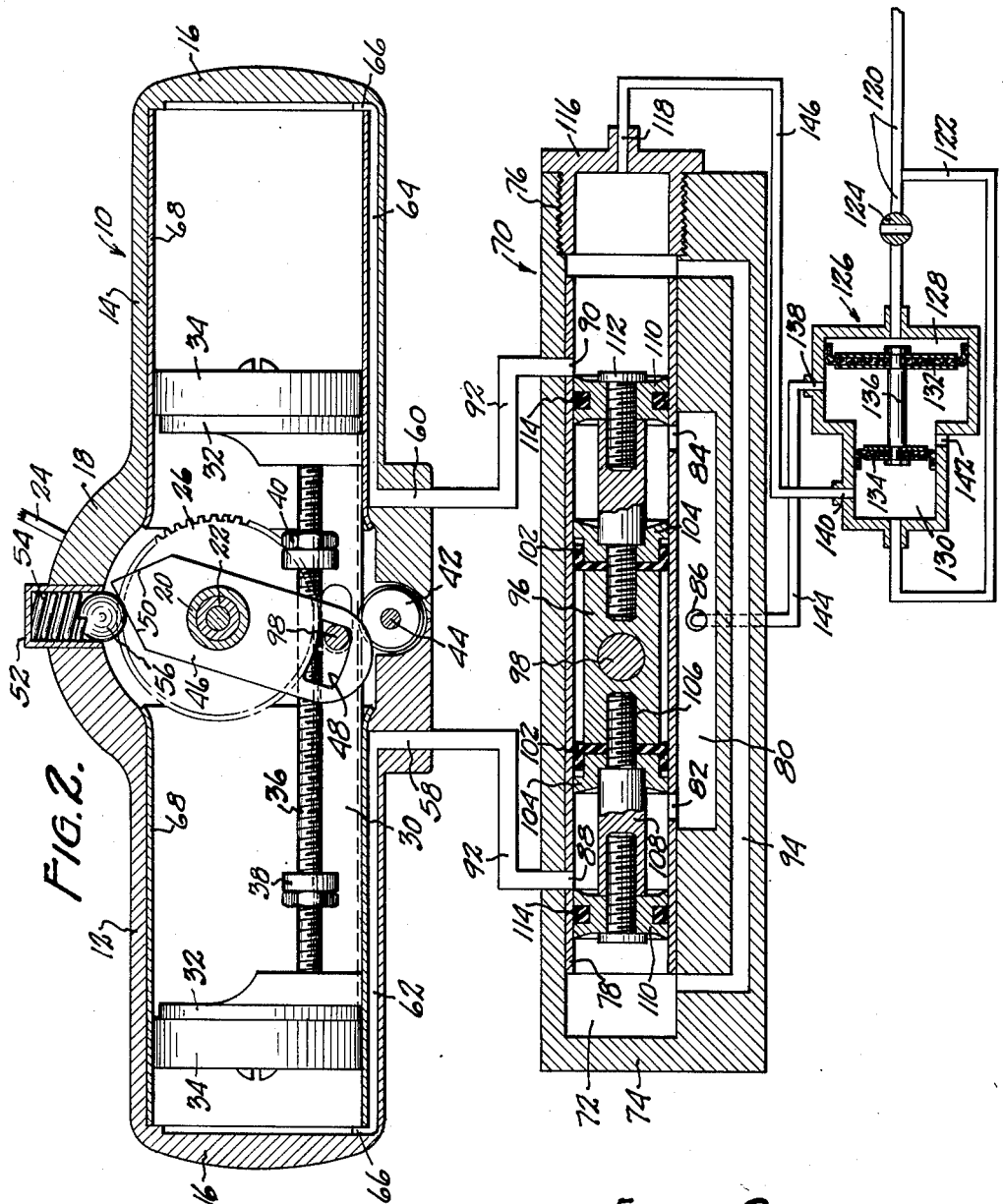
FRANK SPRAGUE AND
ELTON F. NICHOLS.
INVENTORS.

Patented Apr. 6, 1954

2,674,233

UNITED STATES PATENT OFFICE 2,674,233

POWER ACTUATED WINDSHIELD WIPER WITH BLADE POSITIONING MEANS

Frank Sprague and Elton F. Nichols, Michigan City, Ind., assignors to Sprague Devices, Inc., Michigan City, Ind., a corporation of Indiana Application October 28, 1948, Serial No. 57,028

6 Claims. (Cl. 121—164)

1

This invention relates to improvements in power-actuated windshield wipers with blade positioning means, and particularly to a device of this character for automatically positioning the blade of the windshield wiper in a "parking" position out of the line of vision of the driver of the vehicle on which the device is mounted, when the operation of the windshield wiper is stopped.

The primary object of this invention is to provide a novel, simple and inexpensive device which operates to position the blade positively and automatically in the stopped position of the device by the use of the same power medium which is used to actuate the device.

A further object is to provide a windshield wiper having a fluid pressure actuated reciprocating motor, a reversing valve controlled by the position of said motor for controlling the flow of fluid under pressure to said motor, and a control valve for regulating the admission of fluid under pressure from a pressure source to said motor and reversing valve, with a positioning valve interposed between said first valves and so connected with said pressure source as to be automatically operable upon closing of said control valve, said positioning valve being operative upon closing of said control valve to establish a flow of fluid therethrough and through said reversing valve to said motor in a manner to shift said motor to a position at an end of its stroke before the motor stops incident to closing of said control valve.

A further object is to provide a device of this character of the fluid pressure actuated type with a valve having a pair of opposed pistons of different areas and so connected in a fluid pressure system relative to a control valve as to establish one path of flow therethrough when said control valve is open and a different path of flow therethrough when said valve is closed.

A further object is to provide a device of this of flow of fluid under pressure to produce oscillating motor and means for controlling the path of flow of fluid under pressure to produce oscillation of said motor, with means operable to reverse said motor at any position in its stroke and to return it to starting position of said stroke whenever the motor controller is shifted from an operating position to a stopping position.

Other objects will be apparent from the following specification.

In the drawing:

Fig. 1 is a schematic view of the invention illustrating the parts in one position and the unit in condition for operation.

2

Fig. 2 is a schematic view illusrating the parts in another position and the control of the device set for stopping the motor.

This invention is particularly applicable to a windshield wiper of the character illustrated in the copending application of Frank Sprague and Elton F. Nichols, Serial Number 56,066, filed October 23, 1948, and to the extent that the parts hereof are shown diagrammatically, it will be understood that the same are substantially of the construction illustrated in the aforesaid copending application.

The device employs a windshield wiper motor 10 of a type adapted to be actuated by fluid under pressure. This motor is provided with a housing having axially aligned cylindrical portions 12 and 14, each closed at its outer end by an end wall 16. The central portion 18 of the motor housing is enlarged and is spanned by a sleeve 20 extending transversely of the housing and preferably in offset relation to the common axis of the cylinders 12 and 14 as shown. The sleeve 20 is journaled in suitable bearings (not shown) mounted in the housing. A shaft 22 fits snugly within the sleeve 20 and is normally rotatable therewith and detachably secured thereto. The shaft 22 projects from the housing and fixedly mounts an arm 24 upon which a conventional windshield wiper blade is secured in a manner well understood in the art. A pinion 26 is fixedly secured upon the sleeve 20 intermediate the ends of said sleeve.

A piston unit is mounted within the housing of the motor and includes an elongated longitudinal rigid bar 30 upon one surface of which are formed rack teeth 31 with which the teeth of the pinion 26 mesh. The bar 30 is located in spaced relation to the axes of the cylinder portions 12 and 14. At its opposite ends the bar 30 is fixedly secured to rigid transverse plate or disk parts 32 having a snug but free sliding fit in the bores of the cylinders 12 and 14. The members 32 mount sealing members 34 and cooperate therewith to form pistons each having sealed sliding fit in the bore of one of the cylindrical portions of the housing. A rigid rod 36 extends between the piston heads 32 in spaced relation to the bar 30, the pinion 26 and the axes of the pistons, and is screw-threaded along its length. This rod 36 has adjustably mounted thereon two nuts or abutment members 38 and 40, respectively. In the preferred form of the invention the motor housing is preferably internally socketed substantially at its center at the portion thereof adjacent to the bar 30 to receive a roller 42 journaled to the housing at shaft 44 and bearing at its periphery against the surface of the bar 30 opposite the toothed rack forming surface thereof with which the teeth of the pinion 26 mesh.

A quick-throw mechanism is incorporated in the motor and preferably constitutes an elongated rigid plate member 46 having an aperture intermediate its ends having a rotatable fit upon the sleeve 20. The plate 46 is positioned by suitable spacers in selected position along the length of the sleeve 20 to be positioned clear of the bar 30 and the rod 36 but adjacent to the latter. At one end thereof the plate 46 is provided with an elongated transverse arcuate slot 48 for purposes to be mentioned hereinafter. At its opposite end the plate is provided with a pair of converging surfaces 50 which define a pointed end at the transverse center. The housing of the motor adjustably mounts a cup-shaped member 52 closed at its outer end and open to the interior of the motor housing within which is confined a coil spring 54 pressing against a metal sphere 56. This metal sphere engages one or the other of the surfaces 50 of the quick-throw member 46. The quick-throw member 46 is so positioned that it lies in the path of movement of the nuts or abutments 38 and 40 and is shifted thereby as the piston unit approaches an end of its stroke and tilted to a position past center with reference to the spring pressed sphere 56. In other words, as viewed in Fig. 1, as the abutment member moves to the left and engages the quick-throw plate 46, it tilts said plate clockwise, and as soon as the point or tip of the plate 46 passes a dead center position, the spring pressed sphere will bear against the left tip surface 56 to throw the member 46 quickly to the fully tilted position illustrated in Fig. 2.

The housing of the motor is provided with a pair of longitudinally spaced inlet ports 58 and 60 and these ports communicate with the inner ends of longitudinally outwardly extending passages 62 and 64 extending alongside the cylinder bore and communicate at 66 with the interior of said cylinder bores. The passages 62 may be defined by grooves formed in the bodies of the housing parts 12 and 14 within which preformed sleeves 68 have a snug fit, such as a pressed fit, and form the cylinder liners within which the piston units 32 and 34 fit. The wall of the sleeve overlies the grooves 62 and 64 and is of greater length than said grooves to seal said grooves at their inner ends but permit communication between the interior of the sleeve and said grooves or passages 62 and 64 at their outer ends at 66.

The control of fluid under pressure through said ports 58, 60 and passages 62, 64 to actuate the piston units 32, 34 and thereby actuate the motor is effected by a reversing valve 70. This reversing valve is preferably elongated and has a bore 72 therein closed at one end by an end wall 74 and open at its opposite end at an internally screw-threaded mouth 76. Within this bore fits an elongated preformed sleeve 78 of shorter length than said bore and terminating at its ends in spaced relation to the wall 74 and to the threaded outlet 76. A longitudinal passage 80 is formed in the valve housing, as by a groove communicating with the bore 72 but separated from the bore by the sleeve 78. The sleeve has ports 82 and 84 therein which communicate with the passage 80 at the opposite ends of the latter. An intake port 86 communicates with the passage 80. The sleeve 78 is also provided with ports 88 and 90 formed therein in spaced relation to the ports 82 and 84 and preferably at a different radius of said sleeve 78. The ports 88 and 90 communicate through any suitable conduits, bores or passages 92 with the intake ports 58 and 60, respectively, of the motor 10. The housing of the valve 70 is also provided with a by-pass passage 94 communicating at its opposite ends with the bore 72 at points located outwardly from the opposite ends of the sleeve 78, and this by-pass serves to open the opposite ends of the sleeve 78 into communication with each other.

A rigid member 96 fits slidably within the sleeve 78 of the valve adjacent the center thereof and mounts one end of a rigid stud 98. The valve is so positioned with respect to the motor, and the valve housing, the motor housing and the sleeve 78 are so slotted, as shown at 100 in Fig. 1, that the stud 98 may enter the interior of the motor and seat freely within the transverse slot 48 of the quick-throw member 46. Consequently, it will be apparent that the stud 98 will serve as means for transmitting movement of the quick-throw member 46 of the motor to the valving elements of the valve 70. Seals 102, here shown as cup-shaped members, bear against the opposite outer ends of the member 96 and are clamped thereto by means of clamping disks 104 secured to the member 96 by threaded shank portions 106 of rigid studs 108. Rigid disk members 110 are detachably secured to the outer ends of the studs 108 by means of headed bolts 112 screw-threaded in sockets formed in the ends of the studs 108. Each of the disk members 110 is preferably provided with a circumferential groove in which an annular resilient sealing member 114 fits. Both the cup-shaped sealing members 102 and the annular sealing members 104 provide continuous circumferential sealing means within the sleeve 78.

When the motor and the valve are positioned as illustrated in Fig. 1 during the time that the controls for the device, to be mentioned hereinafter, are set in condition to cause the motor to operate, fluid under pressure entering the valve through the inlet port 86 passes through the passage 80 and is discharged into the sleeve 78 through the ports 82 and 84. In the Fig. 1 position of the valve, the seal 114 will be positioned between the ports 82 and 88. Consequently, fluid under pressure will be trapped within the sleeve at the portion thereof between the left-hand seals 102 and 114 and this pressure will remain static. The right-hand end of the valve element, however, is so positioned that the port 90 is open and in communication with the port 84; consequently, fluid under pressure discharging from the passage 80 through the port 84 is in turn delivered through the port 90, the connected conduit 92 and the inlet port 60 of the motor 10 from which it passes through the passage 64 of the motor and enters the outer end of the cylinder 14 to act against the right-hand piston unit 32, 34. During the resulting operation of the motor and the travel of the piston from the right to the left therein, the left cylinder is evacuated by the flow of fluid under pressure therefrom into and through the passage 62, the port 58, the conduit or passage 92, the port 88, the sleeve 78, the bore 72 beyond the end of said sleeve, and the by-pass 94. A fitting 116 is mounted in the screw-threaded end portion 76 of the bore and has an outlet port 118 therein through which fluid under pressure is evacuated. When the piston unit of the motor reaches a position such that the nut or abutment 40 contacts the quick-throw member 46 and throws it to the position shown in Fig. 2, the flow of fluid from said reversing valve 70 to the motor is reversed by virtue of the fact that the stud 98 throws the shiftable valving assembly of said unit to the Fig. 2 position which places the ports 82 and 88 of the sleeve 78 into communication and closes communication between the opposite ports 84 and 90. In that instance fluid under pressure passes from the valve through the port 88 through the passage 92, the motor port 58 and the passage 62 for entry into the left cylinder. Fluid in the right cylinder is evacuated through the passage 64, the port 60, conduit 92, port 90, and thence outwardly in said sleeve and bore for discharge through the port 118 in the fitting 116.

The line 120 is connected with a source of supply of fluid under pressure, such as an air pump operated by the engine of a bus or truck or other vehicle, or by any other means, and has branching therefrom a branch conduit 122. A shut-off valve 124 is located in the conduit 120 outwardly of the branch conduit 122, that is, said valve is located in a position to close the line 120 without closing the branch line 122. A pressure responsive valve 126 is connected with said line 120 outwardly of said valve 124 and is also connected with the branch conduit 122. This valve is preferably a pressure responsive valve and has a housing provided with a large diameter bore 128 at the end thereof communicating with the line 120 and a smaller diameter bore portion 130 connected with the branch conduit 122. The two bore portions 128 and 130 are in communication. A shiftable valve assembly is mounted within the housing of the valve 126 and includes a piston or plunger unit 132 located within and spanning the large portion 128 of the bore and a second piston 134 located within and spanning the small diameter portion 130 of the bore. These two pistons 132 and 134 are secured together in predetermined spaced relation by a rigid rod or spacer 136. The valve housing has a delivery port 138 communicating with the large diameter bore portion 128 thereof substantially centrally of the length of said bore and has a second port 140 communicating with the small diameter portion 130 of said housing intermediate the ends of said small diameter bore portion 130. The housing valve 126 also includes an exhaust port 142 located adjacent the junction between the bore portions 128 and 130 and spaced inwardly relative to the port 142 a distance at least equal to the axial dimension of the piston 134. A conduit or other line 144 connects the valve port 138 with the port 86 of the reversing valve, and the conduit or other line 146 connects the port 140 of the valve 126 with the port 118 of the reversing valve.

When the shut-off valve 124 is in open position, fluid from both the main line 120 and the branch line 122 enters the housing of the valve 126 where it acts oppositely against the two pistons 132 and 134. Inasmuch as the area of the piston 132 is larger than the area of the piston 134, a greater force is exerted against the piston 132, and consequently, the valve assembly 132, 134, 136 is shifted to the left-hand position as illustrated in Fig. 1. Fluid pressure passing through the branch line and entering the outer end of the small bore portion 130 of the housing of valve 126 is thus rendered static or trapped. The piston 132 in its left-hand position uncovers the port 138 and opens it into communication with the conduit 120, and, consequently, fluid under pressure passes from the conduit 120 through the valve, the port 138, the line 144 to the intake port 86 of the reversing valve. Fluid under pressure which is exhausted from the reversing valve 70 in the manner disclosed above passes from the port 118 through the conduit 146 and enters the small diameter portion 134 of the bore of the housing of said valve at the port 140. The piston 134 is so located in this position that said port is uncovered and is open into communication with the exhaust port 142. As long as the shut-off valve remains open as illustrated in Fig. 1, the motor is free to operate or oscillate in a reciprocating motion entailing alternate supply of fluid under pressure to opposite ends of the cylinder as determined by the position of the reversing valve under the control of the quick-throw mechanism including the member 46.

When it is desired to stop the operation of the motor 10, the shut-off valve 124 is actuated to the closed position illustrated in Fig. 2. At this time the supply of fluid under pressure to the large diameter bore portion 128 of the valve 126 is discontinued. Fluid under pressure continues to be supplied through the branch line 122 to the small diameter portion 130 of the bore of the valve housing. Under this condition the pressure acting against the piston 134 serves to shift the valve unit 132, 134, 136 to the right as shown in Fig. 2. In this way the port 140 of the valve is opened into communication with the branch conduit 122 so that fluid under pressure passes through the conduit 146 and enters the reversing valve 70 at the port 118. At the same time port 138 of the valve 126 is opened into communication with the discharge port 142 of said valve, and, consequently, the conduit 144 and the intake port 86 of the valve 70 is open to atmosphere.

Assuming that the valve 124 is closed when the pistons 32, 34 are at an intermediate portion of their stroke from left to right with the quick-throw member 46 positioned as illustrated in Fig. 2, and with the reverse valve 70 set as illustrated in Fig. 2, the flow of fluid from the branch line 122 to the port 118, as mentioned above, will be directed through port 90 of said valve, the communicating conduit 92, the intake port 60 of the motor, the passage 64 of the motor, and into the right cylinder, thereby acting upon the right-hand piston unit 32, 34 to cause the piston unit of the motor to move to its limit to the left. As this motor operation occurs, fluid within the left cylinder is exhausted through the passage 62, port 58, conduit 92, port 88, port 82, passage 80, port 86, conduit 144, port 138, through the body of the valve 126 for exhaust at the discharge port 142. This flow is the reverse of the flow which would occur when the quick-throw member 46 and the valve element of the valve 70 are positioned as illustrated in Fig. 2 at the time when the shut-off valve 124 is open. In other words, the usual direction or path of flow through the circuit with the setting of the reversing valve illustrated in Fig. 2 and with valve 124 open, would cause the pistons 32, 34 of the motor to move from the left to the right instead of from right to left as described. The movement of the piston to the end of the stroke permitted within the motor housing assures that the arm 24 mounting the windshield wiper blade will be positioned at one extreme end of its stroke.

If the shut-off valve 124 is closed while the reversing valve 70 is in the position illustrated in Fig. 1, for which setting, with the valve 124 open, the movement of the pistons would be from left to right as viewed in Fig. 1, a similar reversal of flow occurs. In this instance flow from the branch conduit 122 would pass through the housing of the valve 126 for discharge through the port 140, conduit 146 and into the port 118 of the valve 70. The fluid would then pass through the by-pass 94 of the valve 70 into the end of the bore 72 opposite the port 118 and would pass through the sleeve 78 for exhaust through port 88, conduit 92, into the intake port 58 and the longitudinal passage 62 for discharge into the left end of the cylinder to cause the piston unit 32, 34 therein to move toward the right to the full limit permitted. Fluid in the right end of the cylinder would exhaust through passage 64, port 60, conduit 92, port 84, passage 80, port 86, passage 144, port 138 and the body of the valve 126 for discharge through the port 142.

At all times during the operation of the fluid supply pump or during the continued existence of the supply of fluid under pressure in the source with which the conduit 120 is connected, the valve 126 will remain in the Fig. 2 position as long as the shut-off valve 124 is closed. This provides for the continuous application of pressure against one or the other of the motor pistons as mentioned above, depending upon the position of the reversing valve 70, and thus serves positively to hold the motor at its extreme limit of movement. Observe also in this connection that the pressure acting to move the piston to the right while the parts are in the Fig. 1 position, or to the left while the parts are in the Fig. 2 position, occurring as a result of the shutting of the valve 124, will maintain the motor stopped and at said extreme limit of movement or throw; consequently, there is no possibility during proper operation of the device for the blade of the windshield wiper to move from its "parked" position out of the line of vision of the driver incident to vibration or the like. Observe also that, by reason of the reversed direction of application of fluid pressure, when the pistons of the motor 10 reach the usual limit of movement and cause engagement of one of the abutments 38, 40 with the quick-throw member, that engagement will be solely in a position to stop the continued movement of the motor pistons and not in such a position as to permit said abutments 38 and 40 to actuate the quick-throw member 46. In other words, in the Fig. 1 position when the valve 124 is closed, the abutment 38 will strike the quick-throw member 46, while, if the valve 124 is closed in the Fig. 2 position of the parts, the abutment 40 will contact the quick-throw member. The engagement of the abutment with the quick-throw member will merely serve for pressure application against the quick-throw member in the direction in which it has already been set and will serve further to apply pressure against the stud 98 to hold the reversing valve in the position in which it already has been set.

It will be understood that, while this device has been described and illustrated herein as applied in conjunction with a compressed air system, it may be used with equal facility for operation by liquids under pressure in a closed circulating system. The only requirement in this case, of course, is that the circulating system be complete as by the connection of a line leading from the discharge port 142 of the valve 126, returning to the pump or other source of supply from which the pressure in line 120 is derived.

It will be apparent that this device possesses a number of advantages, and particularly the advantage of a positive positioning and holding of the blade in a part out-of-the-way position at all times when the windshield wiper is not in operation; the avoidance of the use of springs; and the ease of conversion of any pressure actuated windshield wiper to incorporate this positive operation for blade-setting purposes.

While the preferred embodiment of the invention has been illustrated and described herein, it will be understood that changes may be made in the construction within the scope of the appended claims without departing from the spirit of the invention.

I claim:

1. A windshield wiper comprising a fluid pressure actuated reciprocating motor, a fluid pressure circuit connected to said motor, a reversing valve in said circuit actuated by said motor as it approaches the ends of its stroke to reverse the flow of fluid to said motor, a two-position control valve in said circuit, and a third valve in said circuit to control the flow of fluid to said reversing valve, said valve including two opposed portions of different sizes and responsive to fluid pressure in said circuit on opposite sides of said control valve.

2. A windshield wiper comprising a fluid pressure actuated reciprocating motor, a fluid pressure circuit connected to said motor, a reversing valve in said circuit actuated by said motor as it approaches the ends of its stroke to reverse the flow of fluid to said motor, a two-position control valve in said circuit, and a third valve in said circuit, said last named valve including a shiftable valve element having opposed parts of different areas, the large area part of said element being responsive to the pressure in said circuit at the outlet of said control valve and the small area part of said element being responsive to the pressure at the inlet of said control valve.

3. A windshield wiper comprising a fluid pressure actuated reciprocating motor, a fluid pressure circuit connected to said motor, a reversing valve in said circuit actuated by said motor as it approaches the ends of its stroke to reverse the flow of fluid to said motor, a two-position control valve in said circuit, and a third valve in said circuit comprising a housing having a bore of larger size at one end than at the other end, a shiftable plunger in each end part of said housing and means connecting said plungers in predetermined spaced relation, said housing having a pair of inlet ports at its opposite end portions and connected in said circuit on opposite sides of said control valve, a pair of delivery ports at its opposite end portions and a discharge port adjacent to the junction of said large and small bore portions, said plungers being shiftable in unison by fluid pressure between a position in which one delivery port communicates with said discharge port and the other delivery port communicates with the intake port adjacent thereto, and a reverse position in which said one delivery port communicates with the intake port adjacent thereto and the other delivery port communicates with said discharge port.

4. A windshield wiper comprising a fluid pressure actuated reciprocating motor, a fluid pressure circuit connected to said motor, a reversing valve in said circuit actuated by said motor as it approaches the ends of its stroke to reverse the flow of fluid to said motor, a two-position control valve in said circuit, a third normally open valve in said circuit between said control valve and said reversing valve, a by-pass line branching from said circuit at the intake side of said control valve, and a fourth valve connected with said branch line with the discharge of said reversing valve and normally venting fluid discharged from said reversing valve, said third and fourth valves operating in unison in response to a reduction in the pressure acting on said third valve compared to the pressure in said branch lines upon closing of said control valve to place said branch line in pressure-delivering communication with said reversing valve and to place said third valve in pressure-venting position.

5. A windshield wiper comprising a pressure-actuated reciprocating motor, a fluid pressure circuit connected to said motor, a reversing valve controlled by the motor for alternately establishing opposite flow paths to and from said motor, said reversing valve having an inlet and an outlet, said circuit including a pair of delivery conduits respectively connected with said inlet and outlet and a pair of conduits branching from a common source of liquid under pressure, a valve having a pair of opposed pressure responsive elements of different areas each responsive to the fluid in one of said branch conduits for controlling flow in said delivery conduits, said valve having a discharge port normally communicating with the delivery conduit connected to the outlet of said reversing valve, and a shut-off valve in the branch conduit supplying pressure to the pressure responsive element of largest area and normally in communication with the delivery conduit connected to the inlet of said reversing valve.

6. A windshield wiper as defined in claim 5, wherein said motor includes a quick-throw mechanism for positioning said reversing valve, said pressure responsive valve operating in response to the pressure differential in said branch conduit upon closing of said shut-off valve to reverse the flow of liquid to and through said reversing valve from the normal motor-actuating direction of flow whereby said motor is reversed intermediate its stroke and returned to the start of the stroke for which said quick-throw mechanism is set before said motor stops.

References Cited in the file of this patent

UNITED STATES PATENTS

| Number | Name | Date |
|---|---|---|
| 620,158 | Lorimer | Feb. 28, 1899 |
| 1,363,333 | Lower | Dec. 28, 1920 |
| 2,169,451 | Parker | Aug. 15, 1939 |
| 2,344,949 | Rappl | Mar. 28, 1944 |
| 2,378,320 | O'Shei | June 12, 1945 |